United States Patent
Sozzi et al.

(10) Patent No.: US 10,642,761 B2
(45) Date of Patent: May 5, 2020

(54) CERTIFIABLE DETERMINISTIC SYSTEM SOFTWARE FRAMEWORK FOR HARD REAL-TIME SAFETY-CRITICAL APPLICATIONS IN AVIONICS SYSTEMS FEATURING MULTI-CORE PROCESSORS

(71) Applicant: Leonardo S.P.A., Rome (IT)

(72) Inventors: Marco Sozzi, Rome (IT); Massimo Traversone, Rome (IT)

(73) Assignee: Leonardo S.P.A., Rome (IT)

( * ) Notice: Subject to any disclaimer, the term of this patent is extended or adjusted under 35 U.S.C. 154(b) by 0 days.

(21) Appl. No.: 16/346,087

(22) PCT Filed: Oct. 31, 2017

(86) PCT No.: PCT/IB2017/056769
§ 371 (c)(1),
(2) Date: Apr. 29, 2019

(87) PCT Pub. No.: WO2018/078610
PCT Pub. Date: May 3, 2018

(65) Prior Publication Data
US 2019/0340140 A1 Nov. 7, 2019

(30) Foreign Application Priority Data
Oct. 31, 2016 (IT) .................. 102016000109768

(51) Int. Cl.
| G06F 13/16 | (2006.01) |
| B64C 19/00 | (2006.01) |
| G06F 9/38 | (2018.01) |
| G06F 12/1027 | (2016.01) |
| G06F 13/36 | (2006.01) |

(52) U.S. Cl.
CPC .......... *G06F 13/1663* (2013.01); *B64C 19/00* (2013.01); *G06F 9/3816* (2013.01); *G06F 12/1027* (2013.01); *G06F 13/36* (2013.01)

(58) Field of Classification Search
CPC .............. G06F 9/3816; G06F 12/1027; G06F 13/1663; G06F 13/36; B64C 19/00
See application file for complete search history.

(56) References Cited

U.S. PATENT DOCUMENTS 8,261,044 B2 * 9/2012 Kinstler ................ G06F 9/5016
712/28
8,943,287 B1 1/2015 Miller et al.
(Continued)

OTHER PUBLICATIONS

International Search Report and Written Opinion dated Dec. 6, 2017 for PCT Application No. PCT/IB2017/056769, 12 pages.

*Primary Examiner* — Glenn A. Auve
(74) *Attorney, Agent, or Firm* — Dorsey & Whitney LLP

(57) ABSTRACT

An avionics system comprising a central processing unit to implement one or more hard real-time safety-critical applications, the central processing unit comprises a multi-core processor with a plurality of cores, an avionics system software executable by the multi-core processor, a memory, and a common bus though which the multi-core processor can access the memory; the avionics system is characterized in that the avionics system software is designed to cause, when executed, the cores in the multi-core processor to access the memory through the common bus by sharing bus bandwidth according to assigned bus bandwidth shares.

20 Claims, 4 Drawing Sheets

(56) References Cited

U.S. PATENT DOCUMENTS

| | | |
|---|---|---|
| 2012/0084525 A1 | 4/2012 | Jegu et al. |
| 2014/0165073 A1* | 6/2014 | Carlstedt ................... G06F 9/48 |
| | | 718/104 |
| 2014/0379953 A1 | 12/2014 | Heyrman et al. |
| 2016/0085618 A1* | 3/2016 | MacKay ............. G06F 11/1004 |
| | | 714/807 |

* cited by examiner

CERTIFIABLE DETERMINISTIC SYSTEM SOFTWARE FRAMEWORK FOR HARD REAL-TIME SAFETY-CRITICAL APPLICATIONS IN AVIONICS SYSTEMS FEATURING MULTI-CORE PROCESSORS

PRIORITY CLAIM

This application is a U.S. National Stage filing under 35 U.S.C. § 371 of PCT Application No. PCT/IB2017/056769, filed Oct. 31, 2017, which claims the benefit under 35 U.S.C. § 119 of the earlier filing date of Italian Patent Application No, 102016000109768 filed on Oct. 31, 2016, the entire contents of which are hereby incorporated by reference, in their entirety, for any purposes.

TECHNICAL FIELD OF THE INVENTION

The present invention relates in general to avionics systems, namely electronic systems used in aeronautics and astronautics on aircrafts, artificial satellites, and spacecrafts, and in particular to a certifiable deterministic system software framework for hard real-time safety-critical applications in avionics systems featuring multi-core processors.

STATE OF THE ART

As is known, avionics (from aviation and electronic) systems represent a growing part of aircraft costs, and are responsible for various applications, such as navigation, guidance, stability, fuel management, air/ground communications, passenger entertainment, flight control, flight management, etc.

Avionics systems have become central components of aircrafts, and have to ensure a large variety of requirements, such as safety, robustness to equipment failures, determinism, and real-time.

In response to these requirements, aircraft manufacturers have proposed different avionics system architectures, including the recent Integrated Modular Avionics (IMA) system architecture, which is equipping the most recent aircrafts, and where, unlike traditional avionics architectures, where avionics systems have their own private avionics resources, avionics resources are shared by several avionics systems. The avionics resources that are generally shared are computers with real-time operating systems or local area network with real-time communication protocols.

Emerging IMA system architecture has contributed to the development of the so-called x-by-wire distributed applications, namely safety-related avionics applications, such as steering, braking, flight control, that depend on a real-time communication network to connect different electronic components.

Among the constraints avionics systems have to meet, the real-time constraints play a paramount role and have direct impact on architecture design at aircraft and system level, and on the validation/certification process. Aircraft manufacturers have hence to show compliance with international regulations using means that have been accepted by the certification authorities. This includes showing that safety requirements are enforced, establishing the predictability of communication, computing real-time performances, and developing software and hardware according to strict development guidelines.

In parallel, information and communication technologies, as well as processor manufacturing technologies, are evolving, and new solutions for avionics are being proposed.

In particular, in the last years all commercial domains, including avionics, have experienced the progressive disappearance of mono-core processors and the progressive emergence of multi-core processors, i.e. chips integrating several cores.

They feature high integration and a good performance-per-watt ratio thanks to resource sharing between cores. Therefore, they offer promising opportunities due to their high level of computing power. It is expected that suitably-controlled multi-core systems will provide an appropriate increase in computation power needed by complex applications, such as complex flight control systems, needing short response times and huge computations. Standard multi-core processors averagely include 2 to 8 on-chip cores, but the number of cores may be as high as 16.

Cores usually have one or two levels of private instruction and data caches and share an additional level, as well as a common bus to the main memory. Such architectures often implement hardware cache coherency schemes that allow running parallel applications designed under the very convenient shared memory programming model.

However, embedding multi-core processors in avionics systems is a challenge. In fact, multi-core processors involve intensive resource sharing and several non-predictable mechanisms for managing resource sharing, which make it hard to ensure time predictability.

Resource sharing makes timing analysis of safety-critical systems very complex if not infeasible. This is due to the difficulty of taking all the possible inter-task conflicts into account, in particular when the cache coherency controller generates implicit communications.

In particular, the challenges that avionics safety-critical system designers are required to meet are determining the worst-case execution time (WCET), the worst-case communication time, and the worst-case memory access time for any task in order to verify that the hard real-time requirements are always met.

Several approaches are available or have been proposed to improve the worst-case analysis.

A first approach is designing specific predictable multi-core processor architectures, where deterministic behavior of safety-critical applications is guaranteed by causing the safety-critical applications to be executed on one core only, while the others cores are not used.

A second approach is a time-oriented approach, according to which an execution model is applied, where rules that constrain the behavior of the safety-critical applications within associated timing slots and reduce the number of non-predictable behaviors are defined.

In addition to the foregoing, aviation certification authorities such as the U.S. Federal Aviation Administration (FAA) and the European Aviation Safety Agency (EASA) are concerned about the use of Multi-Core Processors (MCPs) in safety-critical avionics systems (Design Assurance Level (DAL) A, B or C) due to potential non-deterministic architectures of multi-core processors and the overall complexity of the systems embedding these processors.

For all these reasons, exploitation of multi-core processors in avionics systems intended to implement hard real-time safety-critical avionics applications is presently a difficult task for avionics system designers, and worst-case predictability is one of the major concerns, due to the fact that mitigation of the risk could be very heavy from different points of view, especially time and cost.

U.S. 2012/0084525 A1 discloses a method and a device for loading and executing instructions with deterministic cycles in a multicore avionics system having a bus of which the access time is not predictable. The avionics system includes a multi-core processor including at least two cores, and a memory controller, each of the cores including a private memory. The plurality of instructions is loaded and executed by execution slots such that, during a first execution slot, a first core has access to the memory controller for transmitting at least one piece of data stored in the private memory thereof and for receiving and storing at least one datum and an instruction from the plurality of instructions in the private memory thereof, while the second core does not have access to the memory controller and executes at least one instruction previously stored in the private memory thereof and such that, during a second execution slot, the roles of the two cores are reversed.

The above-described state-of-the-art approaches are essentially based on either a core-constrictive paradigm, according to which only a single core in the multi-core processor is allowed to operate, or a time-constrictive paradigm, according to which the cores in the multi-core processor are prevented to operate simultaneously but allowed to operate in associated time slots, so resulting in a computational resource waste.

U.S. Pat. No. 8,943,287 B1 discloses a multi-core processor system configured to constrain access rate from memory. The multi-core processor system includes a number of cores, a memory system, and a common access bus that interconnects the cores and the memory system. Each core includes a core processor, a dedicated core cache operatively connected to the core processor, and a core processor rate limiter operatively connected to the dedicated core cache. The memory system includes physical memory, preferably a double data rate (DDR) memory and more specifically DDR SDRAM memory, a memory controller connected to the physical memory, and a dedicated memory cache connected to the memory controller. The core processor rate limiters are configured to constrain the rate at which data is accessed by each respective core processor from the memory system so that each core processor memory access is capable of being limited to an expected value. As a result of rate limiting, the multi-core processor system provides for asynchronous operation between the core processors while the DDR bandwidth required to meet processing deadlines is guaranteed.

SUBJECT AND SUMMARY OF THE INVENTION

The Applicant has appreciated that the approach disclosed in U.S. Pat. No. 8,943,287 B1, which results in an asynchronous operation of the cores in the multi-core processor, is aimed at obviating deficiencies of the state-of-the-art approaches considered in U.S. Pat. No. 8,943,287 B1 and resulting from the relatively high number of constraints to be imposed to the operation of the multi-core processor systems in avionics systems in order to meet the safety requirements, wherein in U.S. Pat. No. 8,943,287 B1 the deficiencies are identified in the inefficient or low efficient utilization of the multi-core processors in avionics systems, that worsen as the number of cores per processor increases, and in the relatively complex design approach when undesired dead times result in the necessity to synchronize the cores in the multi-core processors.

The aim of the present invention is to provide an avionics system software framework that allows exploitation of computational resources of multi-core processors embedded in avionics systems intended to implement hard real-time safety-critical avionics applications to be improved, without adversely affecting the true-deterministic behavior of hard real-time safety-critical applications.

The present invention relates to an avionics system, an avionics system software, a method of characterizing bus bandwidth in an avionics system, and a method of determining bus bandwidth shares in an avionics system, as claimed in the appended claims.

DETAILED DESCRIPTION OF EMBODIMENTS OF THE INVENTION

The present invention will now be described in detail with reference to the attached figures to enable a skilled person to implement and use it. Various modifications to the described embodiments will be immediately apparent to the expert and the generic principles described may be applied to other embodiments and applications, without thereby exiting from the protective scope of the present invention, as defined in the appended claims. Therefore, the present invention should not be considered limited to the forms of embodiment described and illustrated, but should be granted with the widest scope compliant with the described and claimed principles and features.

Figure 1:
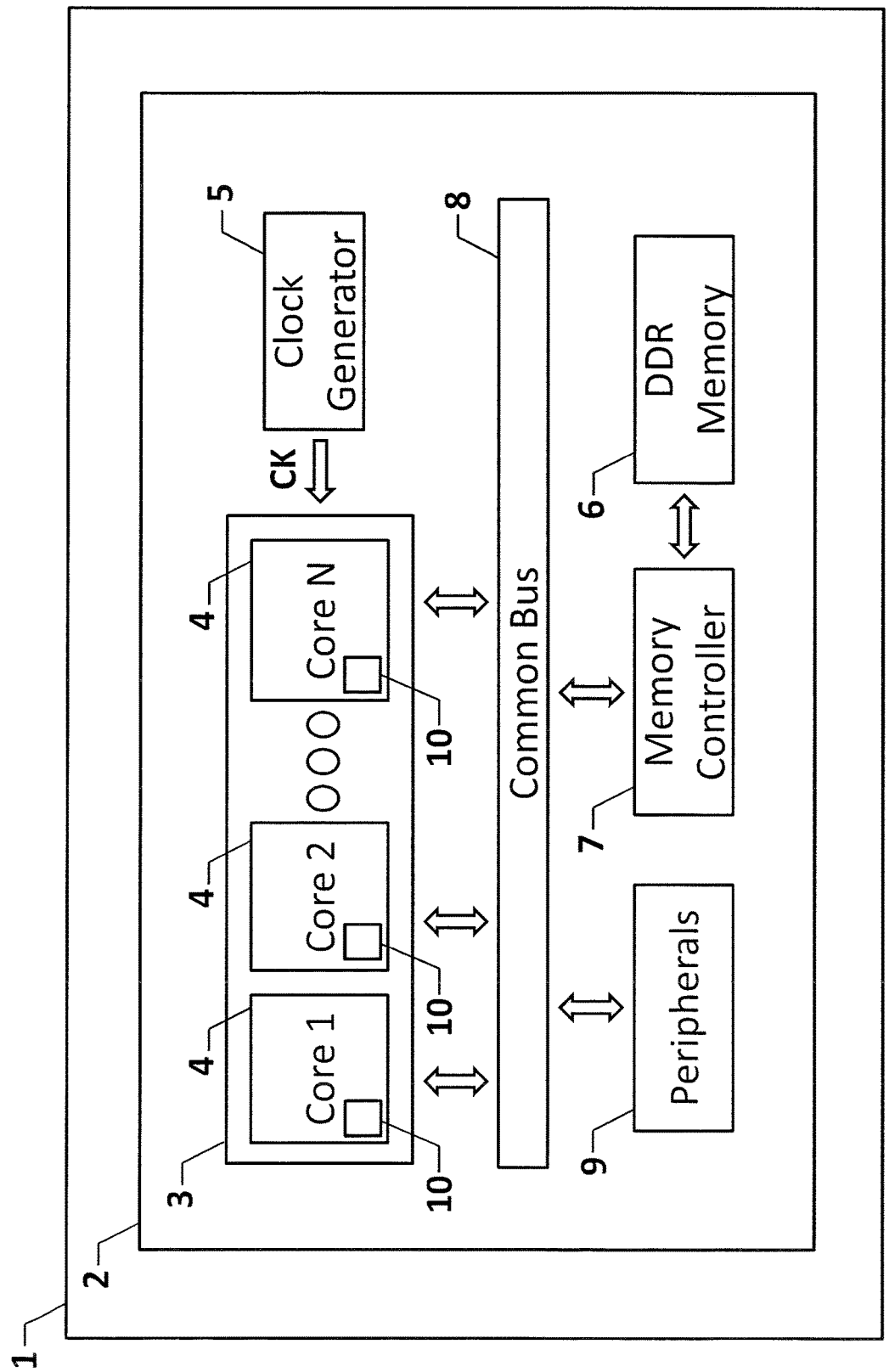
FIG. 1 schematically depicts a block diagram of a multi-core central processing unit embedded in a hard real-time safety-critical avionics system.

FIG. 1 schematically depicts a block diagram of an avionics system 1 comprising a multi-core central processing unit (CPU) 2 to implement hard real-time safety-critical applications, such as such as flight control, flight management, navigation, guidance, stability, fuel management, air/ground communications, etc.

The central processing unit 2 has conveniently an Advanced or Acorn RISC Machine (ARM) architecture and comprises a multi-core processor 3 with a plurality of cores 4, an avionics system software executable by the multi-core processor 3, a clock generator 5 designed to supply the multi-core processor 3 with a clock signal CK, a memory 6 with an associated memory controller 7, and a common bus 8 through which the multi-core processor 3 can access both the memory 6 via the associated memory controller 7, and embedded peripherals 9, as well as external devices via associated I/O interfaces (not shown).

In broad outline, certifiable true-deterministic behaviour of each and every hard real-time avionics safety-critical application executed by the multi-core CPU 2 is achieved by providing an avionics system software designed to cause the cores 4 in the multi-core processor 3 to access the memory 6 through the common bus 8 by sharing bus bandwidth according to assigned bus bandwidth shares.

The bus bandwidth may be shared among the cores 4 in the multi-core processor 3 based on different criteria. In a preferred embodiment, the bus bandwidth may be conveniently equally shared among the cores 4 in the multi-core processor 3, so resulting in the assigned bus bandwidth shares being equal among the cores 4. In another embodiment, the bus bandwidth may be conveniently shared among the cores 4 in the multi-core processor 3 based on their actual bus bandwidth exploitation.

In order to guarantee that the assigned bus bandwidth shares be met by the cores 4, the avionics system software is designed to cause:

actual bus bandwidth exploitations or usages by the cores 4 in the multi-core processor 3 to be scheduled to be periodically checked against the assigned bus bandwidth shares to determine those cores 4 that have eventually overrun the assigned bus bandwidth shares, and those cores 4 that are determined to have overrun the assigned bus bandwidth shares to be scheduled to be idled to compensate for the overruns.

Bus bandwidth exploitations by the cores 4 in the multi-core processor 3 are conveniently determined by resorting to special-purpose hardware registers, known as performance counters 10, built into the cores 4 and programmable to count and store counts of activities performable by, or events relating to the operation of, the associated cores 4.

To reduce this feature to practice, the avionics system software is designed to cause, when executed:

the performance counters 10 to count and store the numbers of accesses of the cores 4 in the multi-core processor 3 to the memory 6 through the common bus 8, so resulting in the counts stored in the performance counters 10 being indicative, ceteris paribus, in particular with regard to the operating frequency of the multi-core processor 3 and the size of data transferred over the common bus 8, of the actual bus bandwidth usages by the associated cores 4 in the multi-core processor 3, the performance counters 10 to be scheduled to be periodically read and the counts read from the performance counters 10 to be scheduled to be periodically checked against corresponding assigned values indicative of the bus bandwidth shares assigned to the cores 4 in the multi-core processor 3 to determine those cores 4 that have eventually overrun the assigned bus bandwidth shares, and the cores 4 in the multi-core processor 3 that are determined to have overrun the assigned bus bandwidth shares to be idled during one or more time intervals between next scheduled checks to compensate for the overruns.

Having regard to the facts that a core 4 in a multi-core processor 3 is typically provided with a plurality of associated programmable performance counters 10, typically in the number of four or six, and that the capabilities of the performance counters 10 may vary depending on the architecture of the central processing unit 2, the avionics system software may be designed to cause the numbers of accesses of a core 4 to the memory 6 through the common bus 8 to be counted either by means of a single performance counter 10, when the cores 4 in the multi-core processor 3 are provided with performance counters 10 capable of directly counting the numbers of accesses of a core 4 to the memory 6 through the common bus 8, or by resorting to two or more performance counters 10, when the cores 4 in the multi-core processor 3 are provided with performance counters 10 that are not capable of directly counting the numbers of accesses of a core 4 to the memory 6 through the common bus 8.

In the latter case, the avionics system software may be designed to cause a first performance counter 10 to count the number of data cache line read and write operations, a second performance counter 10 to count the number of instruction cache line read operations, and a third performance counter 10 and a fourth performance counter 10 to count the number of TLB (Translation Lookaside Buffer) cache refill operations.

The avionics system software may be further designed to cause the number of accesses of a core 4 to the memory 6 through the common bus 8 to be computed as a sum of the counted numbers of data cache line read and write operations, the instruction cache line read operations, and the TLB cache refill operations.

In particular, the number of accesses of a core 4 to the memory 6 through the common bus 8 may be computed as follow:

L1D_CACHE_WB (data cache write back)+ L1I_CACHE_REFILL (instruction cache refill)+ k·L1_TLB_REFILL (data & instruction TLB cache refill) where k is the ratio between the data cache line size and the TLB cache entry size, and the L1D_CACHE_WB performance counter is caused to count correctly the number of data cache read and line write operations by programming the core control register to "inhibit optimization mechanism that prevents the cache pollution". In this way all the memory accesses are forced to go through the cache.

Furthermore, in order to guarantee that the counts stored in the performance counters 10 and representing the numbers of accesses of the cores 4 in the multi-core processor 3 to the memory 6 through the common bus 8 be a faithful and reliable worst-case bus bandwidth usages during real use of the multi-core processor 3, the avionics system software is designed to cause, when executed, access to the peripherals 9 by the cores 4 in the multi-core processor 3 to be conveniently managed by only one of the cores 4, so resulting in it acting as a main core 4 for the access to the peripherals 9, that are hence directly accessible by the main core 4 only, and indirectly accessible by the other ones of the cores 4, that hence act as secondary cores 4, with respect to the main one, for the access to the peripherals 9.

To reduce this feature to practice, the avionics system software is designed to cause, when executed, the peripherals 9 to be virtualized, so resulting in the safety-critical applications executed by different cores 4 indirectly accessing the peripherals 9 through associated logical ports using Application Programming Interfaces (APIs). The associations between the Port IDs and the peripherals 9 are made at compile time.

Causing the peripherals 9 to be managed by a single core 4 prevents peripheral contentions and misleading data due to competing/conflicting/concurrent access to the peripherals 9 by different cores 4, as well as unexpected access to the peripherals 9 by safety-critical applications that, by design, should not access the peripherals 9, so resulting in the contention between the cores 4 being limited to the access to the common bus 8 for the access to the memory 6.

The main core 4 may be caused to manage access to the peripherals 9 either exclusively or in addition to other assigned tasks. When the main core 4 is caused to exclusively manage the access to the peripherals 9, and the performance counters 10 associated to the main core 4 may be caused or are actually caused to count the number of accesses to the memory 6 only, the avionics system software may be designed to cause an access of the main core 4 to a peripheral 9 either to read data therefrom or to write data thereto, to be followed or preceded, respectively, by a corresponding access of the main core 4 to the memory 6 either to write to the memory 6 the data read from the peripheral 9 or to read from the memory 6 the data to be written to the peripheral 9. This association between peripheral accesses and memory accesses results in the bus bandwidth required to access a peripheral 9 becoming computable based on the bus bandwidth required to access the memory 6.

In particular, having regard to the fact that the time required by the main core 4 to access a peripheral 9 may be, and typically is, longer than that required to access the memory 6, so resulting in a worse exploitation of the bus bandwidth share assigned to the main core 4, an access of the main core 4 to a peripheral 9 may be assigned with a weight that is higher, and in particular double or more, than the weight assigned to an access of the main core 4 to the memory 6, so resulting in the bus bandwidth required by the main core 4 to access the peripheral 9 being computable based on the bus bandwidth required to access the memory 6 and the weights assigned to the accesses of the main core 4 to the peripheral 9 and to the memory 6.

For example, in order to take account of the actual bus bandwidth exploitation by peripherals 9, such as a serial line, that may not autonomously access the memory 6 via the common bus 8, the value assigned to the main core 4 and indicative of the bus bandwidth share assigned to the main core 4 is checked against a value that is obtained by multiplying the count read from the performance counter 10 associated to the main core 4 by a multiplication factor, so resulting in the actual bus bandwidth exploitation by these peripherals 9 being "debited" to the main core 4, and wherein the multiplication factor is equal to the ratio between the time required to access the peripheral 9 and the time required to access the memory 6, increased by one.

Moreover, the weight assigned to an access to a peripheral 9 may be caused to be dependent on the type peripheral 9 to be accessed.

For example, in order to take account of the actual bus bandwidth exploitation by peripherals 9, such as an Ethernet line, that are programmed to autonomously access the memory 6 via the common bus 8, namely without requiring involvement of the main core 4, and fail to be provided with associated performance counters 10 programmable to count the number of accesses to the memory 6, the value assigned to the main core 4 and indicative of the bus bandwidth share assigned to the main core 4 is checked against a value that is obtained by multiplying by two the counts read from the performance counter 10 associated to the main core 4, so resulting in the actual bus bandwidth exploitation by the Ethernet peripheral 9 being "debited" to the main core 4.

Having regard to the fact that the bandwidth of the common bus 8 depends on the multi-core processor 3 and of the memory 6 used, as well as on the operating frequency at which the multi-core processor 3 will be operated during use, the worst case bus bandwidth exploitation by the cores 4 in the multi-core processor 3 may be determined priori by implementing a bus bandwidth characterization method comprising:

causing the multi-core processor 3 to operate at a fixed operating frequency at which it will be operated during use,
  causing only one of the cores 4 in the mufti-core processor 3 to repeatedly access the memory 6 through the common bus 8 to transfer cache lines of fixed size, while the other cores 4 are prevented from accessing the common bus 8 by conveniently causing them to operate in a never-end closed loop without access to the memory 6 through the common bus 8,
  determining the number of accesses of the operating core 4 to the memory 6 through the common bus 8 in a given period of time, and
  determining the worst case bus bandwidth exploitation by the cores 4 in the multi-core processor 3 based on the number of accesses of the operating core 4 to the memory 6 through the common bus 8 in the given period of time and the size of the cache lines.

The number of accesses of the operating core 4 to the memory 6 through the common bus 8 in the given period of time may conveniently be determined by resorting to the performance counter 10 of the operating core 4, and in particular by causing it to count the number of accesses of the operating core 4 to the memory 6 through the common bus 8 in the given period of time, which is appropriately chosen to prevent the performance counter 10 from overflowing, and then reading the count stored in the performance counter 10 of the operating core 4.

The operating core 4 is caused to access the memory 6 through the common bus 8 such that the memory address at each access be different from the previous one of a quantity greater than the size of the cache lines, so as to prevent data from being read without accessing the common bus 8.

Moreover, memory 6 is partitioned among the cores 4 such that the cores 4 have different assigned memory partitions so as to prevent unwanted overlapping situations.

As a non-limiting example, should the period of time be chosen to be 100 microseconds, the operating frequency at which the multi-core processor 3 is operated during use be 800 MHz, and the size of the cache lines be 32 Byte, the number of accesses of the operating core 4 to the memory 6 through the common bus 8 in 100 microseconds amounts to 1.500, and the worst case bus bandwidth exploitation resultingly amounts to 480 Mbyte/sec.

Figure 2:
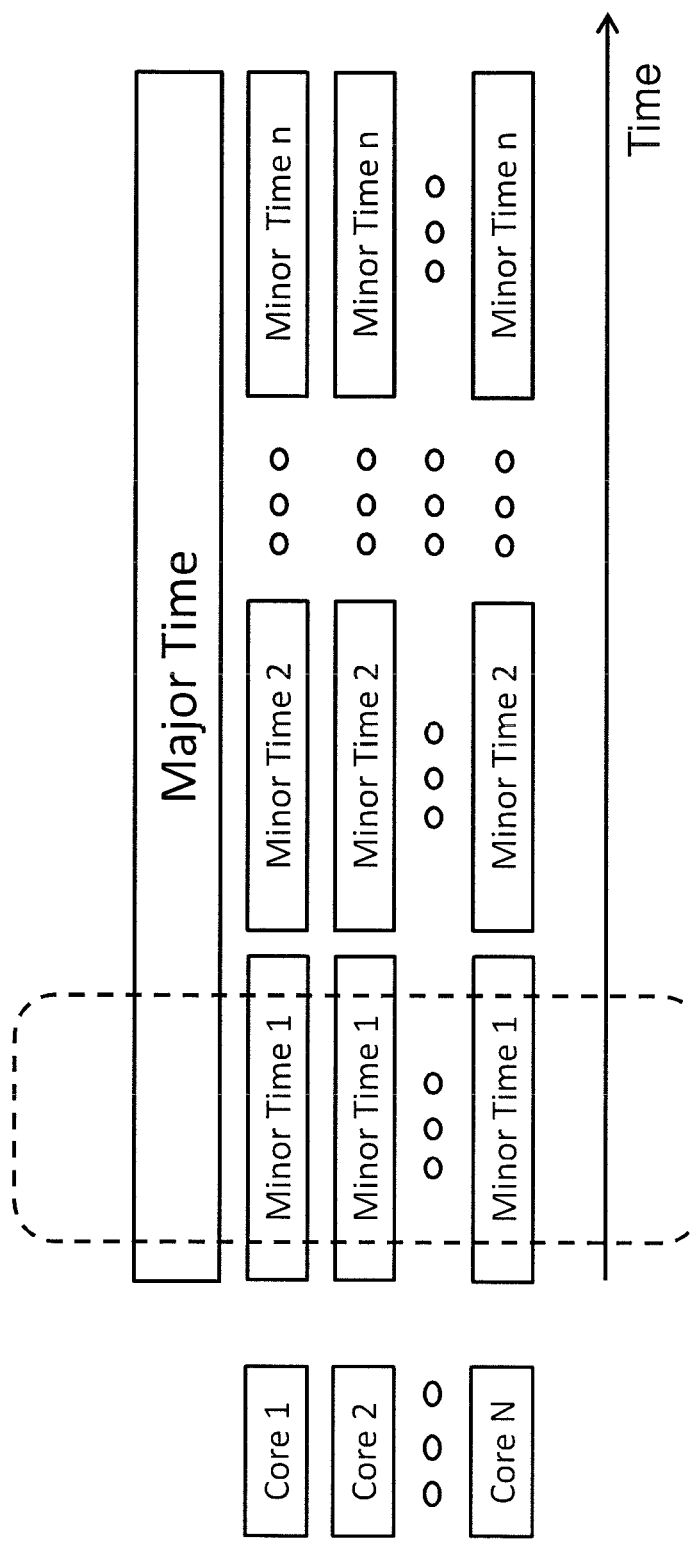
FIG. 2 schematically depicts major and minor time division synchronisation between the cores in the multi-core central processing unit.
Figure 3:
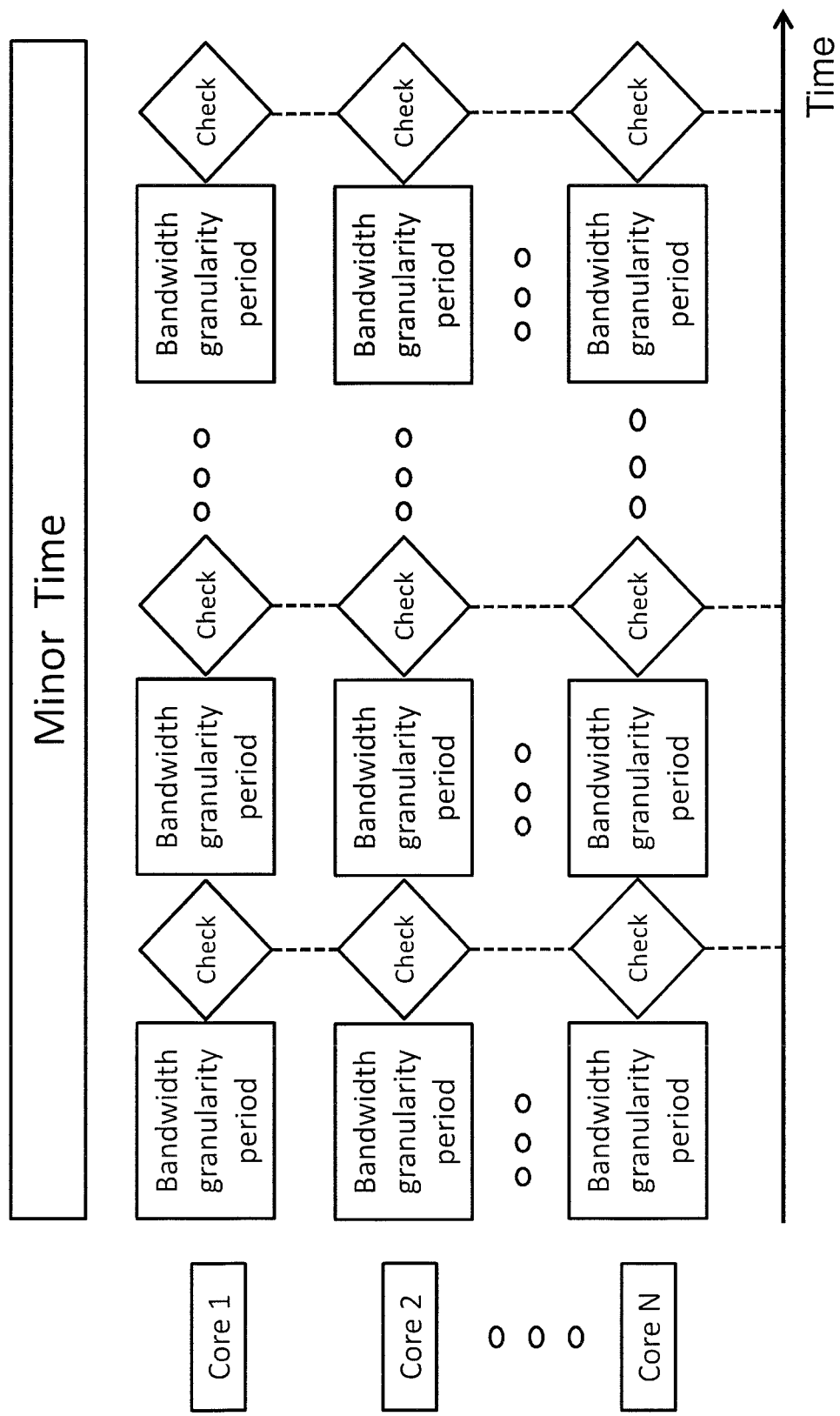
FIG. 3 schematically depicts periodical checks, synchronous among the cores, of bus bandwidth exploitations by the cores against assigned bus bandwidth shares.
Figure 4:
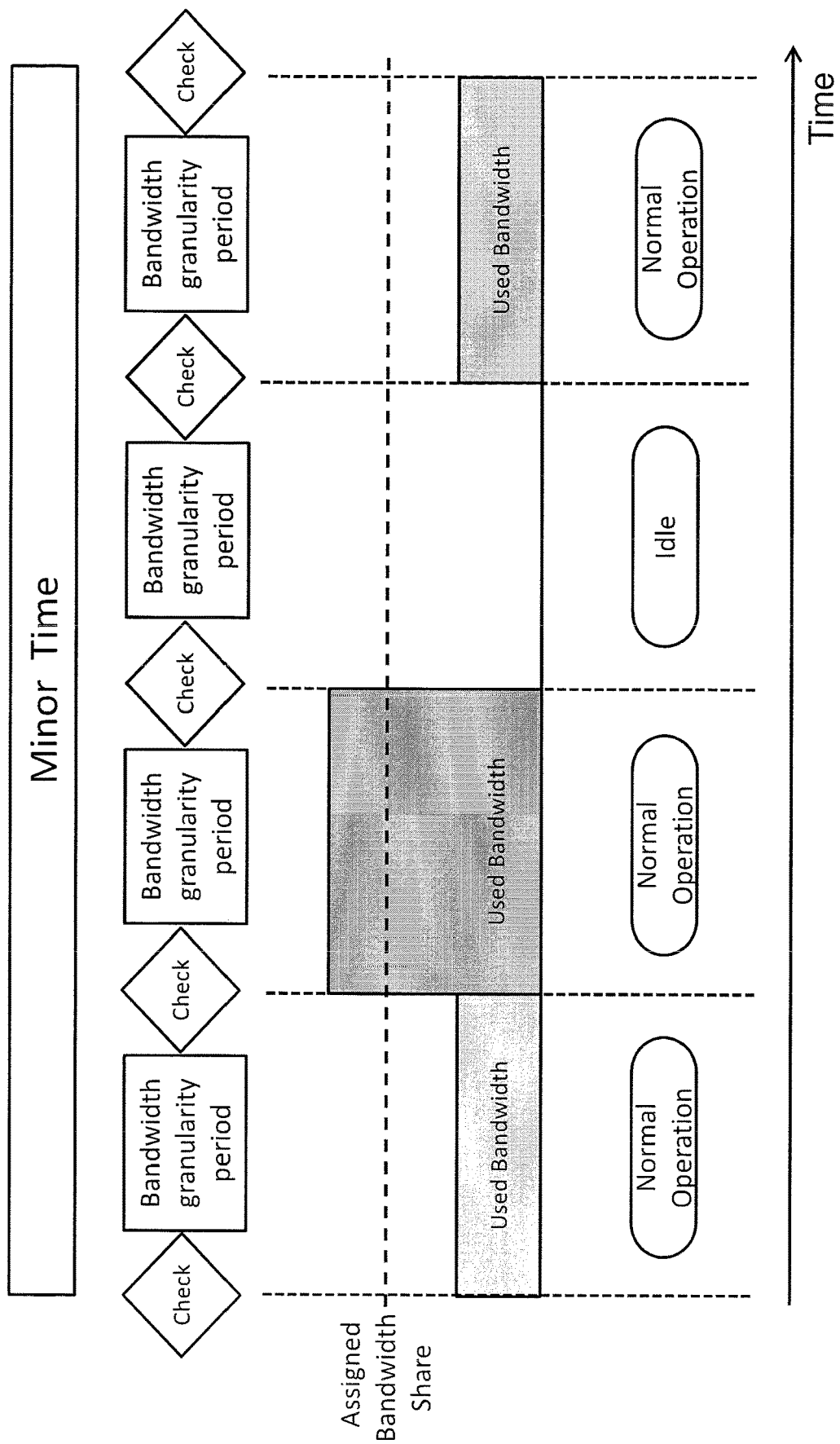
FIG. 4 depicts a bandwidth control process performed by a core.

FIGS. 2, 3 and 4 depicts reduction to practice of the above-described features in a typical avionics environment, where avionics system operation is based on so-called majors and minors, wherein a major is a loop during which a pre-determined number of minors are performed, for example 32 or 64 minors, while a minor is a period of time during which predetermined activities are performed, and generally in the order of magnitude of several or few tens of milliseconds, e.g., 20 milliseconds. As may be appreciated, the minors in a major have the same minor time and are synchronized among the cores 4.

FIG. 3 comparatively shows, instead, the relation between a minor time and the periods of time, referred to as bus bandwidth granularity periods of time, after which actual bus bandwidth exploitations by the cores 4 in the multi-core processor 3 are periodically checked against the assigned bus bandwidth shares to determine those cores 4 that have eventually overrun the assigned bus bandwidth shares.

As it may be appreciated, the periodical checks are synchronized among the cores 4, so resulting in the actual bus bandwidth exploitations by the cores 4 in the multi-core processor 3 being checked simultaneously.

In order to perform a significant number of periodic checks in a minor time, the bus bandwidth granularity period of time should be chosen to be significantly lower than the minor time, conveniently one or more orders of magnitude lower than the minor time, more conveniently as a function of the number of cores 4 in the multi-core processor 3, for example at least ten times the number of cores 4.

In the end, FIG. 4 shows a periodical check performed in relation to one of the cores 4. After a bus bandwidth granularity period of time has elapsed, the actual bus bandwidth exploited by the core 4 in the bus bandwidth granularity period of time is determined based on the count stored in the associated performance counter 10, and then checked against the assigned bus bandwidth share. If the actual bus bandwidth exploitation is determined to be lower than the assigned bus bandwidth share, the core 4 is allowed to operate normally during the next bus bandwidth granularity period of time. If, instead, the actual bus bandwidth exploitation is determined to be higher than the assigned bus bandwidth share, and, hence, to have overrun the assigned bus bandwidth, the core 4 is idled during one or more of the next bus bandwidth granularity periods of time to compensate for the overrun, wherein the number of bus bandwidth granularity periods of time during which the core 4 is idled depends on the extent of the overrun, in particular is equal to rate of the overrun to the assigned bus bandwidth share.

It goes without saying that, in order for an actual bus bandwidth exploitation by a core 4 in a bus bandwidth granularity period of time to be determined, the performance counter 10 associated to the core 4 is to be reset after each check to result in the count stored in the performance counter 10 being zeroed. This results in the bus bandwidth unexploited during a bus bandwidth granularity period of time being lost and, hence, not exploitable during the next bus bandwidth granularity period of time.

Compared to the solution disclosed in U.S. Pat. No. 8,943,287, the present invention provides for checks of the actual bus bandwidth exploitations by the cores 4 in the multi-core processor 3 that are scheduled to be on the one hand periodical at a frequency equal to the inverse of the bus bandwidth granularity period of time, and on the other hand synchronized among the cores 4, so resulting in the actual bus bandwidth exploitations by the cores 4 in the multi-core processor 3 being checked simultaneously on all of the cores 4 in the multi-core processor 3.

Synchronism of the checks of the actual bus bandwidth exploitation by the cores 4 in the multi-core processor 3 results in the WCET being advantageously computable based on the following formula:

$$WCET = WCET_0 + \sum_{i=1}^{N_{TstepNoLimit}} N_{realAcc_i} \cdot (N_{core} - 1) \cdot \left(\frac{T_{step}}{N_{Beq}}\right)$$

where:
$WCET_0$ is the WCET of a tested application running alone on a single operating core $T_{step}$ is the bandwidth granularity period $N_{TstepNoLimit}$ is the number of bandwidth granularity periods related to the $WCET_0$ measurement and during which the operating core has not overrun an assigned bus bandwidth share Beq is the number of accesses of the operating core 4 to the memory 6 through the common bus 8 in a given period of time during the above-described bus bandwidth characterization method $N_{core}$ is the number of cores 4 in the multi-core processors 3

$N_{realAcc_i}$ is the count stored in the performance counter of the operating core 4@i-th bandwidth granularity period.

The invention claimed is:

1. An avionics system comprising a central processing unit to implement one or more hard real-time safety-critical applications, the central processing unit comprises a multi-core processor with a plurality of cores, a memory, a common bus though which the multi-core processor can access the memory and an avionics system software executable by the multi-core processor to cause, when executed, the cores in the multi-core processor to access the memory through the common bus by sharing bus bandwidth according to assigned bus bandwidth shares;

characterised in that the avionics system software is designed to cause, when executed, actual bus bandwidth usages by the cores in the multi-core processor to be scheduled to be periodically checked against the assigned bus bandwidth shares to determine those cores in the multi-core processor that have overrun the assigned bus bandwidth shares, and the cores that are determined to have overrun the assigned bus bandwidth shares to be scheduled to be idled to compensate for the overruns;

and in that the avionics system software is further designed to cause, when executed, actual bus bandwidth usages by the cores in the multi-core processor to be scheduled to be checked against the assigned bus bandwidth shares synchronously among the cores, to result in the actual bus bandwidth usages by the cores in the multi-core processor being checked simultaneously.

2. The avionics system of claim 1, wherein the avionics system software is designed to cause, when executed, the cores in the multi-core processor that are determined to have overrun the assigned bus bandwidth shares to be idled during one or more time intervals between next scheduled checks to compensate for the overruns.

3. The avionics system of claim 1, wherein the cores in the multi-core processor have associated performance counters to count activities performed by the associated cores;

wherein the avionics system software is designed to cause, when executed, the performance counters to count numbers of accesses of the cores in the multi-core processor to the memory through the common bus;

and wherein the avionics system software is further designed to cause, when executed, the performance counters to be scheduled to be periodically read, and counts read from the performance counters to be scheduled to be checked against corresponding assigned values indicative of the bus bandwidth shares assigned to the cores in the multi-core processor to determine the cores that have overrun the assigned bus bandwidth shares.

4. The avionics system of claim 3, wherein the avionics system software is further designed to cause, when executed, a first performance counter to count a number of data cache line write and read operations, a second performance counter to count a number of instruction cache line read operations, and a third performance counter and a fourth performance counter to count a number of TLB cache refill operations;

and wherein the avionics system software is further designed to cause, when executed, the number of accesses of a core to the memory through the common bus to be computed as a sum of the counted numbers of data cache line write and read operations, instruction cache line read operations, and TLB cache refill operations.

5. The avionics system of claim 1, wherein the bus bandwidth is equally shared among the cores in the multi-core processor.

6. The avionics system of claim 1, wherein the multi-core processor is intended to access peripherals through the common bus, and the avionics system software is designed to cause, when executed, only a main one of the cores in the multi-core processor to manage access to the peripherals by all of the cores in the multi-core processor, so resulting in the peripherals being directly accessible by the main core only, while indirectly accessible by secondary cores through the main core.

7. The avionics system of claim 6, wherein the avionics system software is further designed to cause, when executed, an access of the main core to a peripheral to read data therefrom or to write data thereto, to be followed or preceded, respectively, by a corresponding access of the main core to the memory to write to the memory the data read from the peripheral or to read from the memory the data to be written to the peripheral, thereby establishing an association between peripheral accesses and memory accesses that results in the bus bandwidth required to access a peripheral being computable based on the bus bandwidth required to access the memory.

8. The avionics system of claim 7, wherein the avionics system software is further designed to cause, when executed, an access of the main core to a peripheral to be assigned with a weight that is higher than a weight assigned to an access of the main core to the memory, thereby resulting in the bus bandwidth required to access a peripheral being computable based on the bus bandwidth required to access the memory, the weight assigned to an access of the main core to the memory, and the weight assigned to an access of the main core to the peripheral.

9. The avionics system of claim 8, wherein the weight assigned to an access of the main core to a peripheral is dependent on a type peripheral to be accessed.

10. A method of characterizing the bus bandwidth in the avionics system of claim 1 at a fixed operating frequency to which the multi-core processor shall be operated during use, the method comprising:
   causing the multi-core processor to operate at the fixed operating frequency,
   causing only a main one of the cores in the multi-core processor to repeatedly access the memory through the common bus to transfer cache lines of fixed size,
   determining a number of accesses of the main core to the memory through the common bus in a given period of time, and
   determining the bus bandwidth based on the number of accesses of the main core to the memory through the common bus in the given period of time and the size of the cache lines.

11. The method of claim 10, wherein the cores in the multi-core processor have associated performance counters to count activities performed by the associated cores;
   and wherein determining the number of accesses of the main core to the memory through the common bus in the given period of time comprises:
   causing one or more of the performance counters of the main core to count the number of accesses of the main core to the memory through the common bus in the given period of time,
   reading the count in a respective performance counter of the one or more of the performance counters of the main core involved in the count of the number of accesses of the main core to the memory through the common bus in the given period of time, and
   determining the number of accesses of the main core to the memory through the common bus in the given period of time based on the count(s) read from the performance counter(s).

12. The method of claim 10, further comprising:
   causing other cores in the multi-core processor to operate in a never-end closed loop without access to the memory through the common bus.

13. A method of determining bus bandwidth shares to be assigned to the cores in the multi-core processor in the avionics system of claim 1, the method comprising:
   characterizing the bus bandwidth by a characterization method in the avionics system at a fixed operating frequency to which the multi-core processor shall be operated during use, the characterization method comprising:
      causing the multi-core processor to operate at the fixed operating frequency,
      causing only a main one of the cores in the multi-core processor to repeatedly access the memory through the common bus to transfer cache lines of fixed size,
      determining a number of accesses of the main core to the memory through the common bus in a given period of time, and
      determining the bus bandwidth based on the number of accesses of the main core to the memory through the common bus in the given period of time and the size of the cache lines, and
   sharing the bus bandwidth among the cores in the multi-core processor.

14. The method of claim 13, wherein sharing the bus bandwidth among the cores in the multi-core processor comprises:
   equally sharing the bus bandwidth among the cores in the multi-core processor.

15. A non-transitory computer readable media encoded with instructions, which when executed by at a multi-core processor, cause:
   cores in the multi-core processor to access a memory through a common bus by sharing bus bandwidth according to assigned bus bandwidth shares;
   actual bus bandwidth usages by the cores in the multi-core processor to be scheduled to be periodically checked against the assigned bus bandwidth shares to determine those cores in the multi-core processor that have overrun the assigned bus bandwidth shares, and the cores that are determined to have overrun the assigned bus bandwidth shares to be scheduled to be idled to compensate for the overruns; and
   actual bus bandwidth usages by the cores in the multi-core processor to be scheduled to be checked against the assigned bus bandwidth shares synchronously among the cores, to result in the actual bus bandwidth usages by the cores in the multi-core processor being checked simultaneously.

16. The non-transitory computer readable media of claim 15, further comprising instructions to cause the cores in the multi-core processor that are determined to have overrun the assigned bus bandwidth shares to be idled during one or more time intervals between next scheduled checks to compensate for the overruns.

17. The non-transitory computer readable media of claim 15, wherein the cores of the multi-core processor have associated performance counters to count activities performed by the associated cores; and further comprises:
   instructions to cause the performance counters to count numbers of accesses of the cores in the multi-core processor to the memory through the common bus; and
   instructions to cause the performance counters to be scheduled to be periodically read, and counts read from the performance counters to be scheduled to be checked against corresponding assigned values indicative of the bus bandwidth shares assigned to the cores in the multi-core processor to determine the cores that have overrun the assigned bus bandwidth shares.

18. The non-transitory computer readable media of claim 17, further comprising instructions to cause a first performance counter to count a number of data cache line write and read operations, a second performance counter to count a number of instruction cache line read operations, and a third performance counter and a fourth performance counter to count a number of TLB cache refill operations; and wherein the number of accesses of a core to the memory through the common bus is computed as a sum of the counted numbers of data cache line write and read operations, instruction cache line read operations, and TLB cache refill operations.

19. The non-transitory computer readable media of claim 15, wherein the multi-core processor is intended to access peripherals through the common bus, and further comprises instructions to cause only a main one of the cores in the multi-core processor to manage access to the peripherals by all of the cores in the multi-core processor, so resulting in the peripherals being directly accessible by the main core only, while indirectly accessible by secondary cores through the main core.

20. The non-transitory computer readable media of claim 19, further comprising instructions to cause an access of the main core to a peripheral to read data therefrom or to write data thereto, to be followed or preceded, respectively, by a corresponding access of the main core to the memory to write to the memory the data read from the peripheral or to read from the memory the data to be written to the peripheral, thereby establishing an association between peripheral accesses and memory accesses that results in the bus bandwidth required to access a peripheral being computable based on the bus bandwidth required to access the memory.

* * * * *